May 7, 1940. R. A. BRAND 2,199,874
TRASH AND WATER ELIMINATOR
Filed Feb. 2, 1938
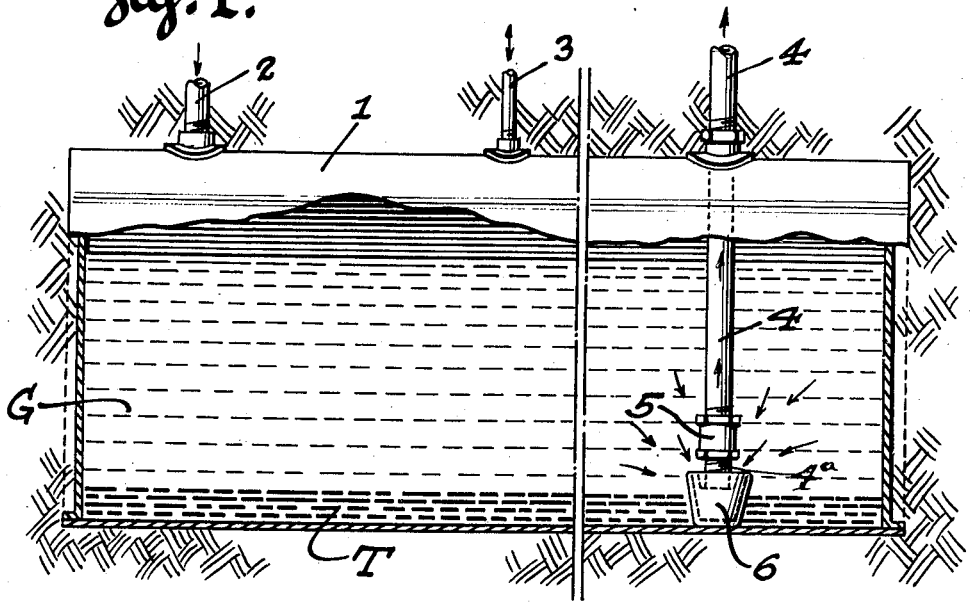
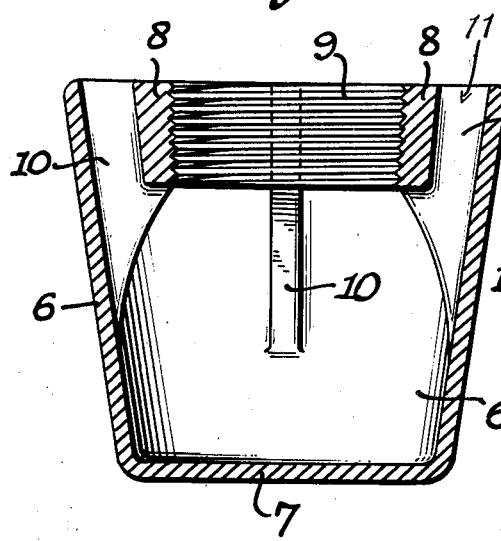
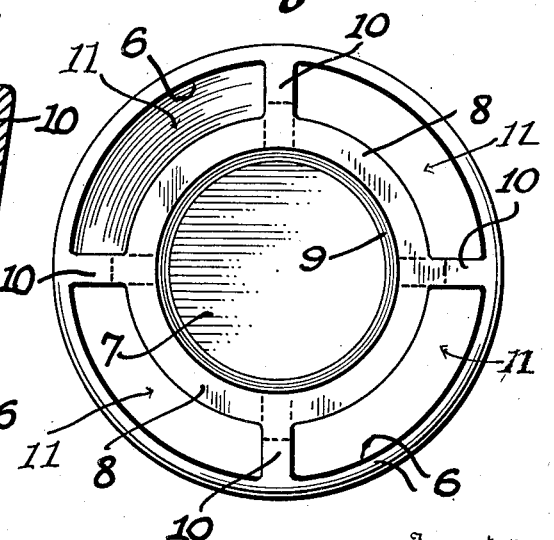
Inventor
Robert A. Brand
By Lester L. Sargent
Attorney Patented May 7, 1940

2,199,874

UNITED STATES PATENT OFFICE 2,199,874

TRASH AND WATER ELIMINATOR

Robert Alfred Brand, Charlotte, N. C.

Application February 2, 1938, Serial No. 188,386

3 Claims. (Cl. 210—209)

My invention relates to a device to be placed in gasoline tanks at stations where gasoline is sold. The object of my invention is to prevent the pump which pumps the gasoline from the large storage tank to the customer's automobile tank from suctioning up water and trash which ordinarily accumulates and settles in the bottom of the large storage tank at the gasoline station. This is very desirable as it often happens that trash and water from the gasoline storage tank is pumped into the small tank of the customer's automobile and finds its way to the automobile carburetor and is liable to clog the carburetor and cause the automobile to stall.

It is also an object of my invention to provide a device of similar character which can easily be attached to the pipe which extends into the gasoline storage tank and which can be attached at a minimum expense.

I attain these and other objects of my invention by the mechanism illustrated in the accompanying drawing, in which—

Figure 1 is a view partly in section and partly in elevation, the storage tank being shown in longitudinal section and my invention shown in side elevation applied to the pipe 4;

Fig. 2 is a vertical section through my device; and

Fig. 3 is a top plan view of same.

Like numerals designate like parts in each of the several views.

Referring to the accompanying drawing, there is illustrated a gasoline storage tank 1 having a pipe 2 leading into same for filling the tank, a pipe 3 for admission of air to the tank and a pipe 4 through which gasoline is pumped from the tank to the small tank of the automobile. Member 5 is a union between pipe 4 and extension 4a. My device consists of an inverted frusto-conical wall 6 integral with the bottom member 4. Preferably integral with wall 6 are a plurality of ribs 10, which are preferably integral with the ring 8 which is interiorly threaded at 9 for threaded engagement with pipe extension 4a. The member 7 seats on the bottom of the gasoline storage tank 1, as shown in Fig. 1. The upper edge of the inverted frusto-conical wall of the tank 6 will be on a plane above that of any water or trash T which may collect in the bottom of the tank under the gasoline G, which is stored in the tank. Consequently the gasoline is pumped from the tank through the passages 11 between the ribs 10, as indicated by arrows in Fig. 1 of the drawing. The member 7 makes a closed bottom to the device and no fluid can enter through the bottom of the device but only through its top portion. The accumulation of water and trash in even the largest and oldest tanks does not normally get above one or more inches and this device which extends only a few inches above the bottom of the tank, as shown, permits the gasoline supply to be taken from a plane above that.

What I claim is:

1. A device adapted to be attached to the lower end of a pipe from which gasoline is pumped from a storage tank, said device extending only a few inches above the bottom of the tank but above the normal water level at the bottom of the tank, having a flat bottom seating on the bottom of the storage tank, an inverted frusto-conical annular side wall integral with the bottom, ribs projecting interiorly from said side wall, passages between the ribs for the admission of gasoline but sufficiently narrow to exclude trash, and a ring supported by said ribs, said ring being attachable to the lower end of the pipe leading from the gasoline storage tank.

2. A device adapted to be attached to the lower end of a pipe from which gasoline is pumped from a storage tank, said device extending only a few inches above the bottom of the tank but above the normal water level at the bottom of the tank, having a flat bottom seating on the bottom of the storage tank, an inverted frusto-conical annular side wall integral with the bottom, ribs projecting interiorly from said side wall, passages between the ribs for the admission of gasoline but sufficiently narrow to exclude trash, and a ring supported by said ribs, said ring being attachable to the lower end of the pipe leading from the gasoline storage tank, said ring being interiorly threaded for engagement with a corresponding threaded end of the pipe.

3. A device to be attached to the lower end of a pipe from which gasoline is pumped from a storage tank, said device extending only a few inches above the bottom of the tank but above the normal water level at the bottom of the tank, having a flat bottom seating on the bottom of the storage tank, an inverted annular side wall integral with the bottom, ribs projecting interiorly from said side wall, passages between the ribs for the admission of gasoline but sufficiently narrow to exclude trash, and a ring supported by said ribs, said ring being attachable to the lower end of the pipe leading from the gasoline storage tank, said ring being interiorly threaded for engagement with a corresponding threaded end of the pipe.

ROBERT ALFRED BRAND.